(12) United States Patent
Chen et al.

(10) Patent No.: US 6,367,879 B1
(45) Date of Patent: Apr. 9, 2002

(54) FOOTREST OF STROLLER

(75) Inventors: Er-Jui Chen, Feng-Shan; Chuan-Tao Tai, Chia-I Hsien; Chih-Jung Chang, Chia-I, all of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/639,676

(22) Filed: Aug. 10, 2000

(51) Int. Cl.$^7$ .................................. B62B 9/00
(52) U.S. Cl. ............... 297/423.25; 280/47.4; 297/423.26
(58) Field of Search .............. 280/642, 650, 280/47.38, 47.4, 163, 166; 297/423.1, 423.19, 423.25, 423.26, 423.4, 423.36, 423.44

(56) References Cited

U.S. PATENT DOCUMENTS

| | | | | |
|---|---|---|---|---|
| 3,672,722 A | * | 6/1972 | Murcott | 297/423.26 |
| 4,229,039 A | * | 10/1980 | Day | 280/650 |
| 4,626,030 A | * | 12/1986 | Kassai | 297/423.25 |
| 4,714,292 A | * | 12/1987 | Kassai | 297/423.26 |
| 5,725,238 A | * | 3/1998 | Huang | 280/642 |
| 5,911,431 A | * | 6/1999 | Brown et al. | 280/642 |
| 6,170,853 B1 | * | 1/2001 | Brown et al. | 280/642 |

* cited by examiner

*Primary Examiner*—Michael Mar
(74) *Attorney, Agent, or Firm*—W. Wayne Liauh

(57) ABSTRACT

A height adjustable mechanism for footrest of stroller is provided. The adjustable mechanism comprises two tubes on both sides mounted for sliding on front legs, a support attached between tubes, and a brace member under the support. The brace member has a plurality of notches, each has a height different from the other. A selected notch may be engaged with a connecting tube between front legs such that the height of footrest stroller is adjustable.

1 Claim, 6 Drawing Sheets

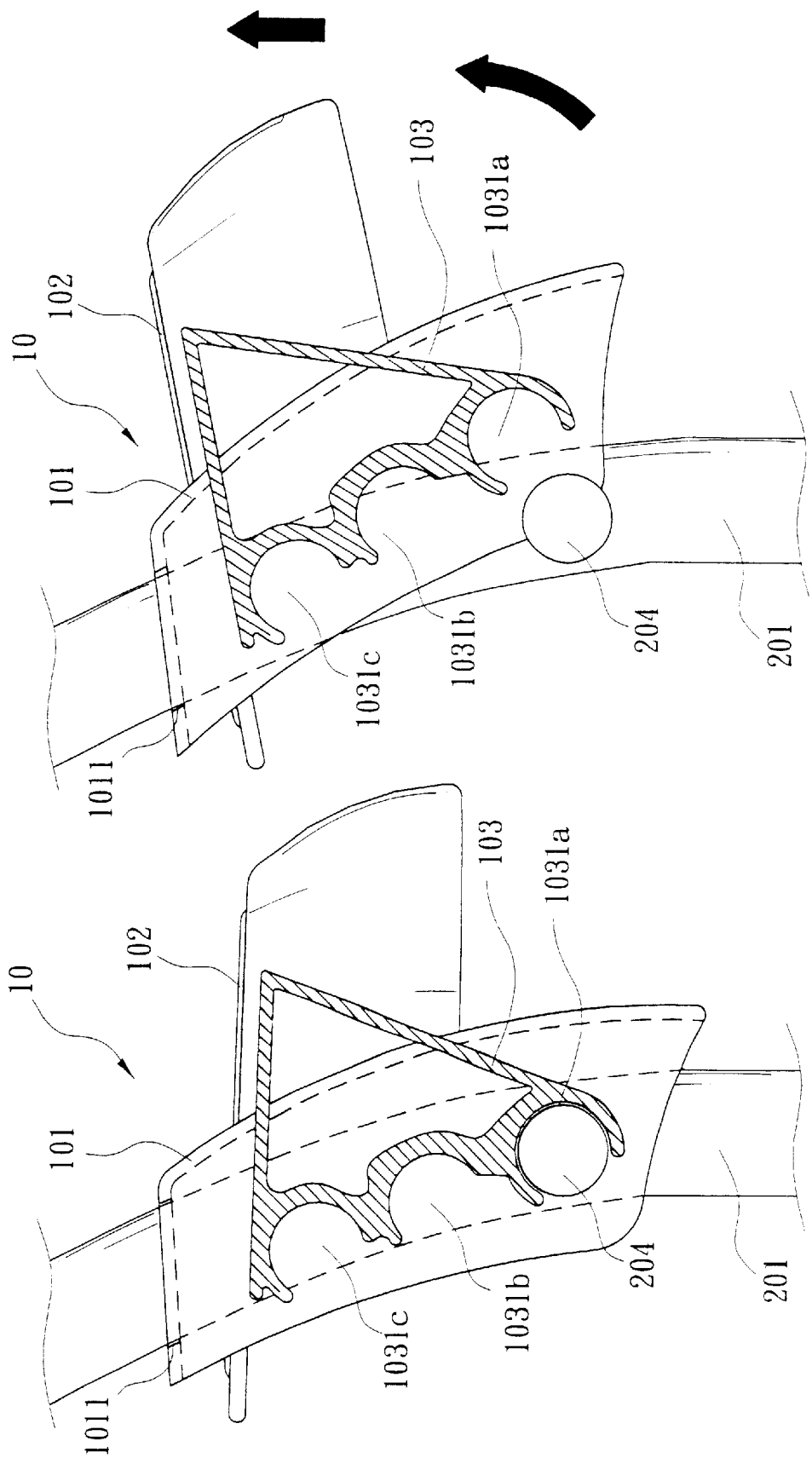

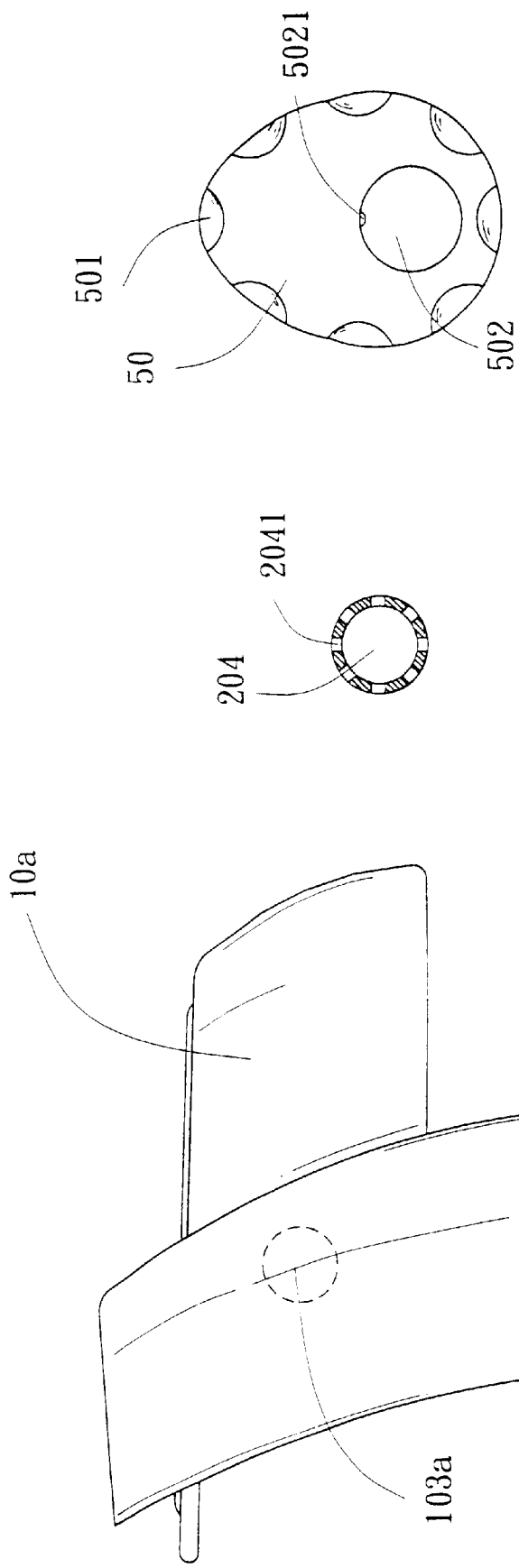

FOOTREST OF STROLLER

BACKGROUND OF THE INVENTION

1. Field of Invention

The present invention relates to a stroller for infants and more particularly to a height adjustable mechanism of footrest of stroller.

2. Related Art

Strollers have been popular for many years to provide a convenient vehicle for parent to carry infant to go out. Conventionally, most of these strollers are made collapsible. A typical collapsible stroller comprises a frame being movable between a collapsed position and an operating position. The collapsible frame comprises front legs, rear legs, a handle, a seat tube, a footrest, seat, and four sets of wheels. With this configuration, parent can easily push stroller with an infant seated on the seat and feet rested on the footrest.

Typically, such footrest is rigidly affixed to the front legs. This is disadvantageous. For example, infant with shorter legs may suspend in the air, infant with longer legs may be forced to bend to rest on footrest, and so on. The later may cause infant to feel uncomfortable while seating on stroller which in turn causes parent to pay a great attention to the infant when the infant becomes impatient. Also, infants may grow up in a short period of time. Such fixed footrest may not be suitable for infant after such short period of time since purchase.

SUMMARY OF THE INVENTION

It is therefore an object of the present invention to provide an adjustable mechanism for footrest of stroller. The adjustable mechanism comprises two tubes mounted for sliding on front legs, a support attached between tubes, and a brace member under the support. The brace member has a plurality of notches each has a height different from the other. A selected notch may be engaged with a connecting tube between front legs such that a height adjustable mechanism for footrest of stroller is effective.

Further scope of applicability of the present invention will become apparent from the detailed description given hereinafter.

BRIEF DESCRIPTION OF THE DRAWINGS

The present invention will become fully understood from the detailed description given thereinafter illustration only, and thus are not limitation of the present invention, and wherein:

FIGS. 3A and 3B are side views in part section for schematically illustrating the operation of a first preferred embodiment of the footrest of stroller of present invention;

FIGS. 4A, 4B, and 4C are side views in part section for schematically showing the components of a second preferred embodiment of mechanism for the relative positioning of footrest according to the invention;

DETAILED DESCRIPTION OF THE INVENTION

Figure 1:
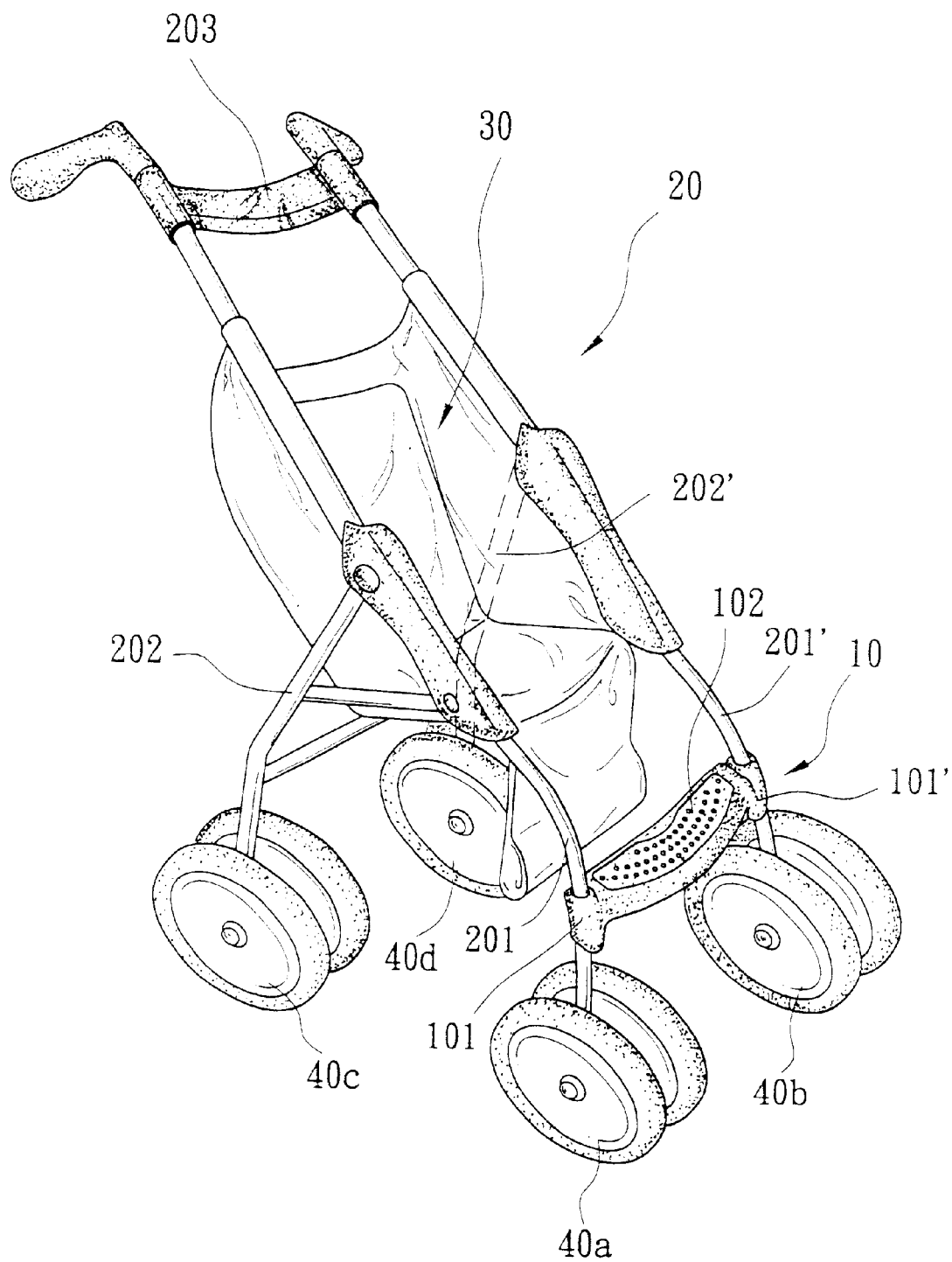
FIG. 1 is a perspective view of the footrest of stroller of present invention.
Figure 2:
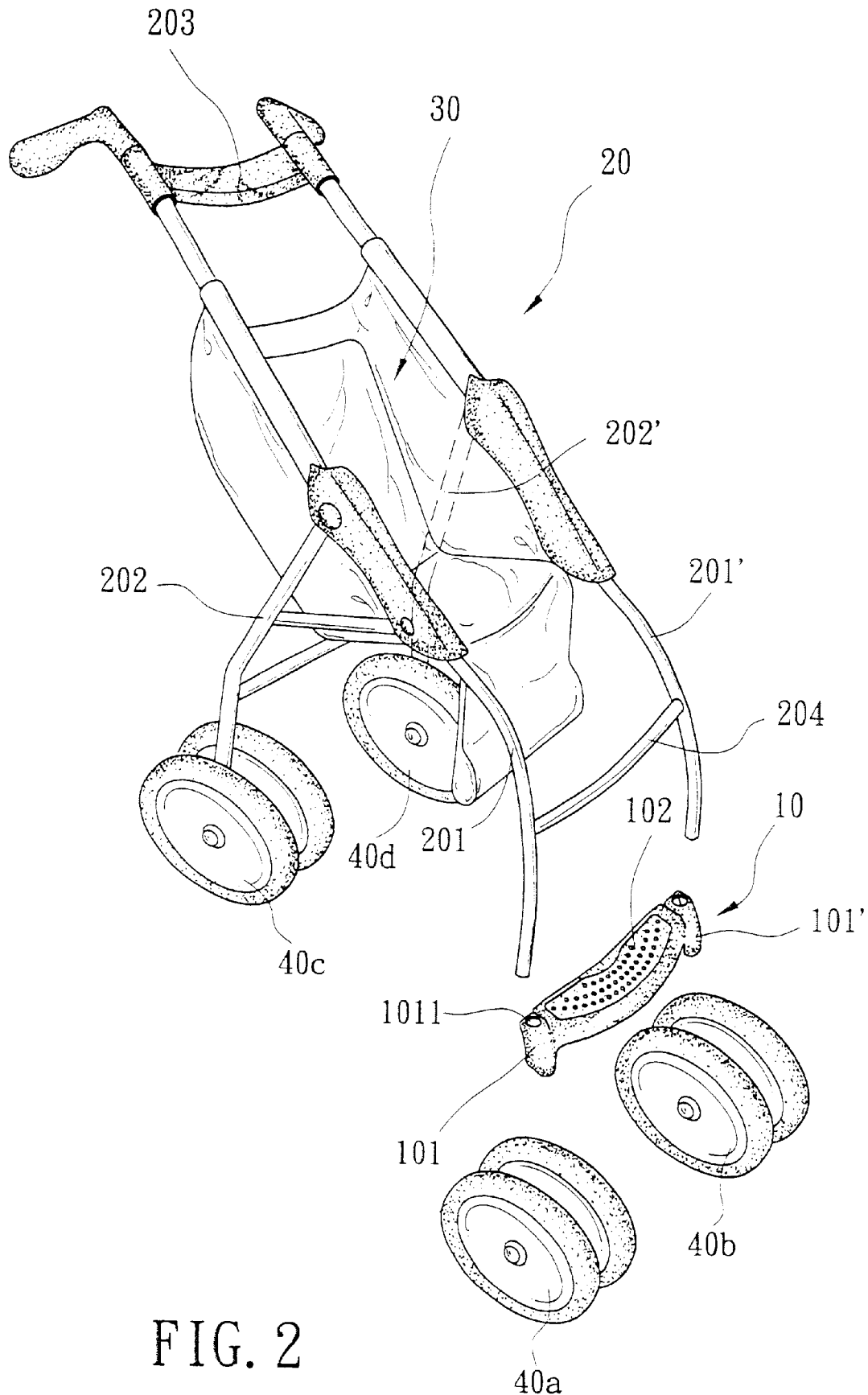
FIG. 2 is a view similar to FIG. 1, showing the front wheels and footrest are separated from stroller.

Referring to FIGS. 1 and 2, there is shown a stroller equipped with a height adjustable mechanism for footrest in accordance with the invention. This stroller comprises a frame 20 including front legs 201, 201', rear legs 202, 202', and a handle 203, a seat 30 and four sets of wheels 40a, 40b, 40c, and 40d. The seat 30 is fabric covered on front legs 201, 201' for permitting an infant to seat thereon. The wheels pivotally mounted on the ends of front legs 201, 201' and rear legs 202, 202' such that stroller may move along the ground. A connecting tube 204 below the seat 30 connected between front legs 201, 201', and a footrest 10 provided on connecting tube 204.

Referring to FIGS. 3A and 3B, there is shown a first preferred embodiment of the invention. The footrest 10 comprises two tubes 101, 101' on both sides having holes 1011 mounted for sliding on front legs 201, 201', a support 102 attached between tubes 101, 101' for permitting the feet to rest on. A brace member 103 under the support 102 having a plurality of notches 1031a, 1031b, and 1031c. The notches 1031a, 1031b, and 1031c have generally half-round cross-sections wherein their arranged-status like a ladder with different height. A selected one of the notches 1031a, 1031b, and 1031c may engage with connecting tube 204 such that the footrest 10 is sustained on the connecting tube 204.

In the height adjustable mechanism for footrest, first raise footrest 10 to cause notch 1031a (FIG. 3A) to disengage from connecting tube 204. Next move footrest 10 down to cause notch 1031b to engage with connecting tube 204 (FIG. 3B). This completes a simple height adjustment of footrest from a highest position to a middle position. Likewise, user may engage any of notches 1031a, 1031b, and 1031c with connecting tube 204 for adapting to the length of the feet of stroller occupant.

Referring to FIGS. 4A to 4C, there is shown a second preferred embodiment of the invention. In this embodiment, brace member 103a is implemented as bar (FIG. 4A). As shown in FIG. 4B, a plurality of circumferential holes 2041 on connecting tube 204. As shown in FIG. 4C, a cam 50 has a plurality of circumferential recesses 501 wherein each has different distance to the center of the cam 50 from the other. A transverse through hole 502 is provided within cam 50. A projection 5021 is provided on the surface of hole 502. The cam 50 is pivotally mounted on either side of connecting tube 204.

Figure 5B:
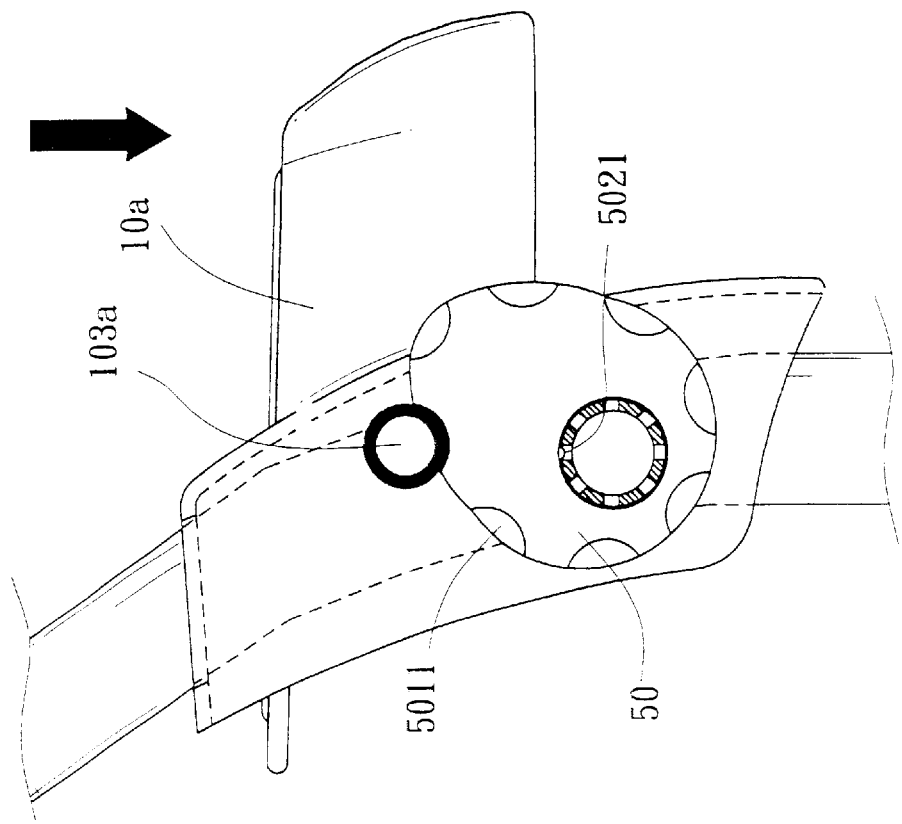
FIGS. 5A and 5B are perspective view for schematically illustrating the operation of the assembled mechanism of FIG. 4.
Figure 5A:
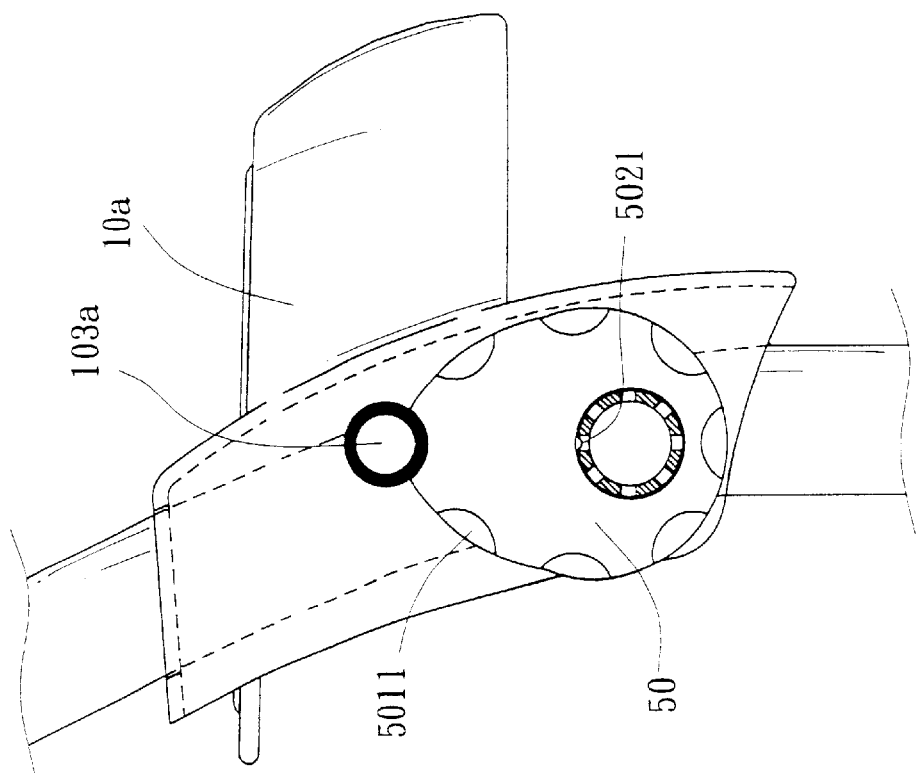

Referring to FIG. 5A, in one configuration connecting tube 204 is inserted into the hole 502 of cam 50 with projection 5021 moved into the hole 2041 for engagement therewith. Brace member 103a is engaged with recess 501.

In the height adjustable mechanism for footrest 10a, first raise footrest 10a to cause brace member 103a to disengage from recess 501. Next turn the cam 50 to a desired angle and release footrest 10a to cause brace member 103a to fall into engagement with another recess 501 (see FIG. 5B). This also completes a height adjustable mechanism of footrest from a highest position to a desired position because, as stated above. The distance between the center of cam 50 and one recess 501 is different from the distance between the center of cam 50 and any of the other recess 501. The distance is the height of brace member 103a (or footrest 10a) above connecting tube 204. Likewise, user may engage any of recesses 501 with brace member 103a for adapting to the length of the feet of stroller occupant.

Figure 6A:
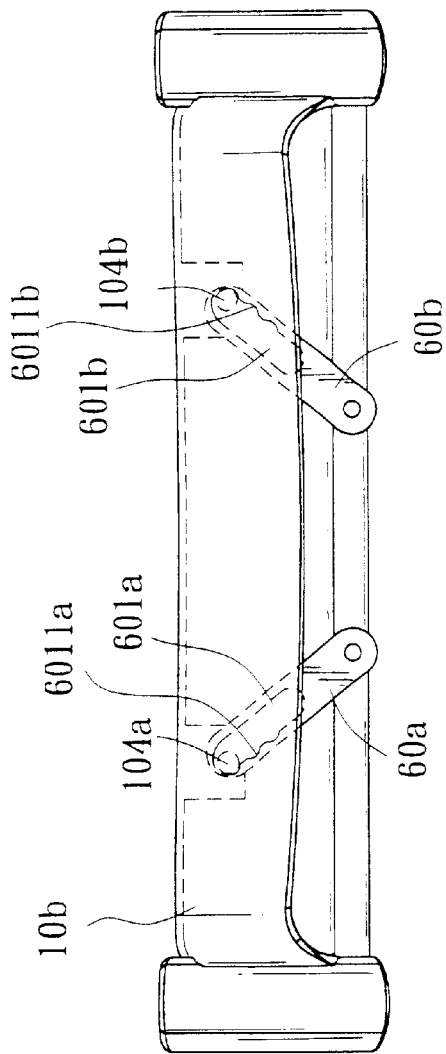
FIGS. 6A and 6B are perspective view for schematically illustrating the operation of a third preferred embodiment of the footrest of stroller of present invention.
Figure 6B:
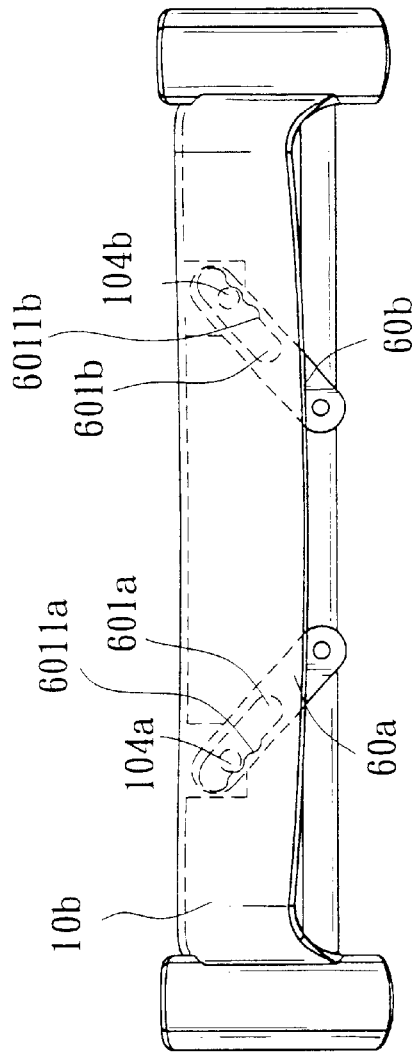

Referring to FIG. 6A and 6B, there is shown a third preferred embodiment of the invention. In this embodiment, two notched members 60*a*, 60*b* with bottom ends pivotally provided on connecting tube 204 having elongate slots 601*a*, 601*b* respectively. Slots 601*a*, 601*b* have a plurality of notches 6011*a*, 6011*b* with different height. Pins 104*a*, 104*b* are inserted through slots 601*a*, 601*b* and notches 6011*a*, 6011*b* to secure footrest 10*b* to connecting tube 204 through the notched members 60*a*, 60*b* (FIG. 6A).

In the height adjustable mechanism for footrest 10*b*, first raise footrest 10*b* to cause pins 104*a*, 104*b* to disengage from notches 6011*a*, 6011*b*. Next move pins 104*a*, 104*b* along the slots 601*a*, 601*b* away from notches 6011*a*, 6011*b*. Finally, at a desired position to release footrest 10*b* to cause pins 104*a*, 104*b* to fall into engagement with another notches 6011*a*, 6011*b* (see FIG. 6B). This also completes a height adjustment of footrest from a lowest position to a desired position. Likewise, user may engage pins 104*a*, 104*b* with any of notches 6011*a*, 6011*b* respectively for adapting to the length of the feet of stroller occupant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A footrest for attachment to a stroller having a frame which includes a pair of tubular front legs, a pair of tubular rear legs, and a connecting tube extending transversely between the pair of front legs, a seat attached to the frame, and a plurality of wheels rotatably mounted to the pairs of front and rear legs, the footrest comprising:

a support member having a pair of tubular shaped portions formed at opposite ends thereof and a planar upper surface portion formed between the tubular shaped portions, each tubular shaped portion having a circular opening at an upper end for slidably receiving a respective one of said pair of front legs and each tubular shaped portion being open along a rearward side for permitting forward pivotal movement of the tubular shaped portion relative to the front leg; and a brace member fixedly attached to an underside of the support member, the brace member having a plurality of arcuate shaped portions arranged in a substantially vertical array, each arcuate shaped portion having a rearwardly facing opening, wherein said pair of tubular shaped portions are slidable and pivotable relative to said pair of front legs for permitting said connecting tube to be received through a selected one of the rearwardly facing openings and retained within a respective arcuate shaped portion for adjusting a vertical height of the footrest relative to the pair of front legs.

* * * * *